No. 873,895.　　　　　　　　　　PATENTED DEC. 17, 1907.
W. C. ROBINSON.
APPARATUS FOR TESTING OILS.
APPLICATION FILED NOV. 9, 1906.
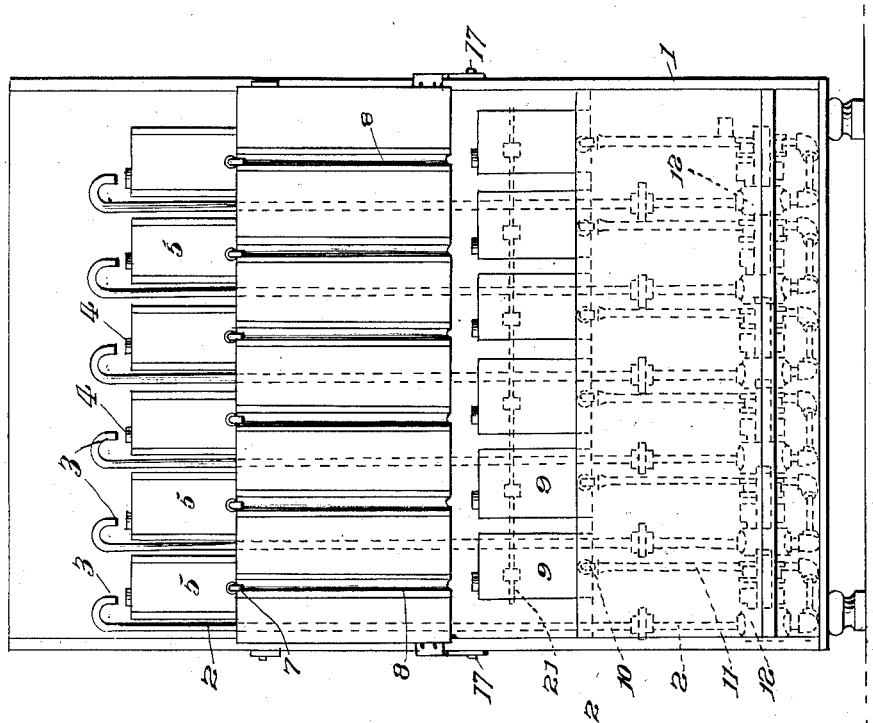
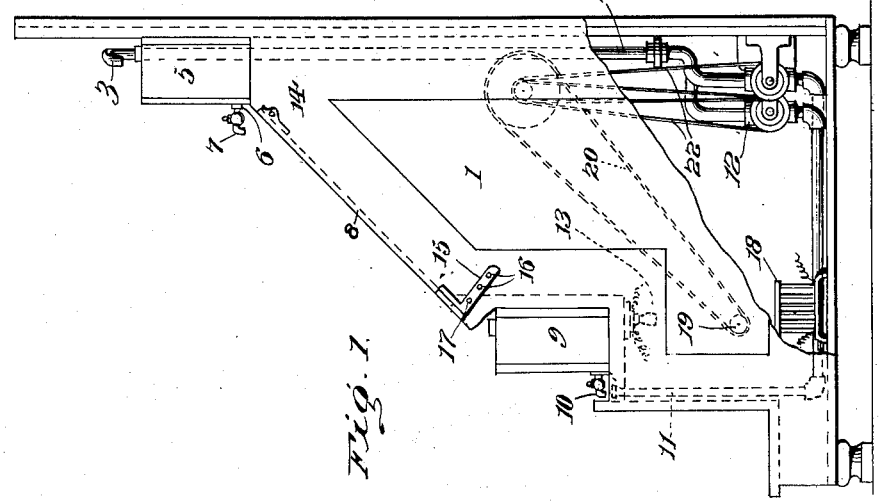
Witnesses　　　　　　　　　　　Inventor
　　　　　　　　　　　　　　　W. C. Robinson
　　　　　　　　　By Stewart & Stewart
　　　　　　　　　　　　　　　　Attorneys

UNITED STATES PATENT OFFICE.

WILLIAM CHAMPLIN ROBINSON, OF BALTIMORE, MARYLAND.

APPARATUS FOR TESTING OILS.

No. 873,895.　　　Specification of Letters Patent.　　　Patented Dec. 17, 1907.

Application filed November 9, 1906. Serial No. 342,717.

*To all whom it may concern:*

Be it known that I, WILLIAM CHAMPLIN ROBINSON, a citizen of the United States of America, and resident of the city of Baltimore, State of Maryland, have invented certain new and useful Improvements in Apparatus for Testing Oils, of which the following is a specification.

My invention has for its object a means for simultaneously testing or determining the various characteristics of an oil and for simultaneously testing and comparing the characteristics of several oils under identical conditions, and under conditions such that an effective comparison of the oils may be had.

Oils must be tested as to their viscosity, as to their homogeneity and freedom from grit and other deleterious substances, and as to their action and character under different or varying temperatures. It is desirable that these several tests be conducted simultaneously, and it is also desirable that several oils may be compared in respect to their different characteristics under identical conditions.

With these objects in view I have designed an apparatus in which several oils may be tested simultaneously. The oils are caused to circulate in a closed circuit, part of which circuit they travel by virtue of gravity and part under the action of suitable pumping apparatus. During that part of their path of travel in which they are flowing under the action of gravity their viscosity is tested, and in a portion of the path of travel the oils are made to pass through or over a transparent or translucent guideway lighted from behind, or an opaque guideway may be used, so that the mechanical consistency, purity and homogeneity of the oils may be observed, as well as their color. Each oil has a circuit of its own and the several circuits are parallelly disposed, having similar testing apparatus side by side in each circuit. The several oils are lifted by pumping means and a suitably disposed heater adjacent the oil conductors determines with certainty the temperature of all the oils.

Having set forth the general objects and nature of my invention I will now describe an embodiment of the same in detail in connection with the accompanying drawings in which Figure 1 is a view in side elevation of my assembled apparatus. Fig. 2 is a front elevation of the apparatus shown in Fig. 1.

Referring to the drawings, in the frame 1 of the machine are shown several parallelly disposed oil circuits. These consist of vertical pipes (2) in the rear of the apparatus, terminating at their tops in curved ends (3) disposed vertically over the openings (4) in the receptacles (5). Outlets (6) from the receptacles are controlled by spigots (7), which are disposed vertically over oil runs (8). The lower end of the runs terminate over the open receptacles (9), the outlets from which are in turn controlled by spigots (10) leading to pipes (11), which descend vertically to the base of the apparatus and then horizontally to pumps (12) by means of which the oil is again lifted through the pipes (2) to the receptacles (5), completing the circuit.

The runs (8) are across a plate of translucent or transparent material and by reason of this and of a light (13) within the apparatus, the homogeneity and purity of the oils may be noted in their passage down the runs (8).

The viscosity of the oils is determined by their rate and character of flow down the runs (8), and the speed of such flow may be varied by adjusting the angular position of the plate across which the runs (8) extend. For this purpose the plate is hinged at its upper end, as at 14, and at its lower end is provided with adjustable means comprising a tongue (15) attached to the plate and provided with a series of holes (16), any one of which, according to the position of the plate, may be engaged by a pin (17) carried by the frame (1).

In order that the viscosity and consistency of the oils may be tested under different and varying degrees of temperature, a heater (18), preferably of a readily and accurately adjustable character such as an electric heater, is arranged at the base of the apparatus adjacent the horizontal portion of the pipes (11).

In the apparatus shown the pumps are operated from a driven shaft (19) by means of a belt (20) to a countershaft (21), and from the shaft (21) to the pump-shaft by means of belts (22).

The advantages of my invention are obvious. All the oils pass near each other and simultaneously across the pivoted plate.

In their passage over the plate their relative viscosity and other characteristics are all observable, and the relative actions of the oils under a variation in the temperature is likewise at once observed.

Having thus described my invention what I claim and desire to secure by Letters Patent is:—

1. In an oil testing machine, an oil circuit having as a part thereof a sloping transparent grooved plate, and a light behind the plate.

2. In an oil testing machine, an oil circuit having as a part thereof, an angularly adjustable transparent runway, and a light behind the runway.

3. In an oil testing machine, an oil circuit having as a part thereof a sloping transparent runway, and means for regulating the temperature of the oil passing over the runway.

4. In an oil testing machine, an oil circuit having as a part thereof an angularly adjustable runway, and means for regulating the temperature of the oil in the runway.

5. In an oil testing machine, an oil circuit having as a part thereof an angularly adjustable transparent runway, a light behind the runway, and means for regulating the temperature of the oil in the runway.

6. In an oil testing machine, an oil circuit having as a part thereof a runway for testing the viscosity of the oil, and for determining the purity of the oil in the circuit.

7. In an oil testing machine, an oil circuit having as a part thereof a runway for testing the viscosity of the oil, and for determining the purity of the oil in the circuit, and means for regulating the temperature of the oil in the circuit.

8. In an oil testing machine, a sloping runway, a pump for lifting the oil to the top of the runway, a reservoir to catch the oil at the foot of the runway, and a passage for the oil from the reservoir to the pump.

9. In an oil testing machine, a sloping transparent runway, a light behind the same, a pump for lifting the oil to the top of the runway, a reservoir to catch the oil at the foot of the runway, and a passage for the oil from the reservoir to the pump.

10. In an oil testing machine, an angularly adjustable transparent runway, a light behind the same, a pump for lifting the oil to the top of the runway, a reservoir to catch the oil at the foot of the runway, and a passage for the oil from the reservoir to the pump.

11. In an oil testing machine, a sloping runway, a valve controlled oil reservoir at the top of the same, a pump for lifting oil into said reservoir, a second reservoir at the foot of the runway for catching the oil at the foot of the runway, and a passage for the oil from the reservoir to the pump.

12. In an oil testing machine a plurality of adjacently disposed oil runs, whereby the purity of the oils in the several runs and their viscosity may be comparatively determined and means for varying the velocity of flow in the several runs.

13. In an oil testing machine, a series of parallelly disposed oil runs and means for adjusting the angular position of such runs simultaneously.

14. In an oil testing machine, a plate having several oil runs across the face thereof, and means for angularly adjusting the plate.

15. In an oil testing machine, a plate having several transparent oil runs across the face thereof, and a light behind the plate.

16. In an oil testing machine, an angularly adjustable plate having several transparent oil runs across the face thereof, and a light behind the plate.

17. In an oil testing machine, an angularly adjustable plate having several oil runs across the face thereof, and means for regulating the temperature of the oils crossing the plate.

Signed by me at Baltimore, Maryland, this 31st day of October 1906.

WILLIAM CHAMPLIN ROBINSON.

Witnesses:
WM. D. POULTNEY,
EDW. G. COLE.